US009562518B2

(12) United States Patent
Patel et al.

(10) Patent No.: US 9,562,518 B2
(45) Date of Patent: Feb. 7, 2017

(54) MOUNTABLE WIND TURBINE

(71) Applicant: Lilu Energy, Inc., Rancho Santa Margarita, CA (US)

(72) Inventors: Mahesh N. Patel, Rancho Santa Margarita, CA (US); Darmesh M. Patel, Rancho Santa Margarita, CA (US); Mark Goodley, Newport Beach, CA (US)

(73) Assignee: LILU ENERGY, INC., Rancho Santa Margarita, CA (US)

( * ) Notice: Subject to any disclaimer, the term of this patent is extended or adjusted under 35 U.S.C. 154(b) by 61 days.

(21) Appl. No.: 14/265,120

(22) Filed: Apr. 29, 2014

(65) Prior Publication Data

US 2015/0308409 A1      Oct. 29, 2015

(51) Int. Cl.
  *F03D 9/00*   (2016.01)
  *F03D 7/06*   (2006.01)
  *F03D 3/06*   (2006.01)

(52) U.S. Cl.
  CPC .............. *F03D 9/002* (2013.01); *F03D 3/062* (2013.01); *F03D 7/06* (2013.01); *F05B 2220/708* (2013.01); *F05B 2240/911* (2013.01); *Y02E 10/728* (2013.01); *Y02E 10/74* (2013.01)

(58) Field of Classification Search
  CPC ............ F03D 9/002; F03D 7/06; F03D 11/04; F03D 3/005; F03D 3/062; Y02E 10/74
  See application file for complete search history.

(56) References Cited

U.S. PATENT DOCUMENTS

| | | | |
|---|---|---|---|
| 3,130,677 A | 4/1964 | Liebhart | |
| 3,556,239 A | 1/1971 | Spahn | |
| 3,743,848 A | 7/1973 | Strickland | |
| 3,876,925 A | 4/1975 | Stoeckert | |
| 4,095,422 A | 6/1978 | Kurakake | |
| 4,168,759 A | 9/1979 | Hull et al. | |
| 4,314,160 A | 2/1982 | Boodman | |
| 4,606,697 A * | 8/1986 | Appel | F03D 3/02 415/4.4 |

(Continued)

OTHER PUBLICATIONS

Authorized Officer Copenheaver, Blaine, R., "International Search Report" mailed Jul. 23, 2015. PCT/US2015/028083. 2 Pages.

(Continued)

*Primary Examiner* — Viet Nguyen
(74) *Attorney, Agent, or Firm* — Stetina Brunda Garred & Brucker

(57) ABSTRACT

A wind turbine configured to be mountable to a support post includes a first support element having a first track positioned around a central axis and configured to be connectable to the support post. A fan assembly is engaged with the first support element and is rotatable relative thereto. The fan assembly includes a plurality of first trolleys each being coupled to the first support element and spaced relative to each other. The plurality of first trolleys are traversable along the first track to cause rotation of the fan assembly relative to the first support element. A plurality of fan blades are coupled to respective ones of the plurality of first trolleys. At least one off-axis electrical generator is engaged with the fan assembly and includes at least one rotating gear driven by at the fan assembly when the fan assembly rotates relative to the first support element.

16 Claims, 15 Drawing Sheets

(56) References Cited

U.S. PATENT DOCUMENTS

| | | | |
|---|---|---|---|
| 4,818,888 A | * | 4/1989 | Lenoir, III .......... F03B 17/065 |
| | | | 290/43 |
| 4,832,569 A | * | 5/1989 | Samuelsen ............ F03D 3/068 |
| | | | 290/55 |
| 5,419,683 A | | 5/1995 | Peace |
| 5,680,032 A | | 10/1997 | Pena |
| 6,302,640 B1 | | 10/2001 | McKelvey |
| 6,388,782 B1 | | 5/2002 | Stephens et al. |
| 6,672,522 B2 | | 1/2004 | Lee et al. |
| 6,740,989 B2 | | 5/2004 | Rowe |
| 7,323,791 B2 | | 1/2008 | Jonsson |
| 7,329,965 B2 | | 2/2008 | Roberts et al. |
| 7,969,036 B2 | | 6/2011 | Chung |
| 8,164,213 B2 | * | 4/2012 | Mahaffy ................ F03D 3/005 |
| | | | 290/44 |
| 8,197,179 B2 | | 6/2012 | Selsam |
| 8,362,641 B2 | | 1/2013 | Gandy |
| 8,497,592 B1 | | 7/2013 | Jones |
| 9,046,074 B2 | | 6/2015 | Patel et al. |
| 9,057,357 B2 | | 6/2015 | Patel et al. |
| 2003/0170123 A1 | | 9/2003 | Heronemus |
| 2004/0071541 A1 | | 4/2004 | Rainbow |
| 2005/0212300 A1 | * | 9/2005 | Kimura .................. F03D 3/005 |
| | | | 290/55 |
| 2007/0022738 A1 | | 2/2007 | Norris et al. |
| 2007/0107949 A1 | | 5/2007 | Bradley et al. |
| 2007/0296216 A1 | * | 12/2007 | Liao ...................... F03D 3/005 |
| | | | 290/52 |
| 2008/0157526 A1 | * | 7/2008 | Davison ................ F03B 17/064 |
| | | | 290/3 |
| 2008/0169652 A1 | * | 7/2008 | Green .................... F03D 3/005 |
| | | | 290/44 |
| 2008/0304968 A1 | | 12/2008 | Fite |
| 2009/0224554 A1 | | 9/2009 | Flynn |
| 2009/0250939 A1 | * | 10/2009 | Curme .................... E04H 12/10 |
| | | | 290/55 |
| 2010/0013238 A1 | | 1/2010 | Jessie et al. |
| 2010/0026009 A1 | | 2/2010 | Sarwin |
| 2010/0090469 A1 | | 4/2010 | Sullivan |
| 2010/0132234 A1 | | 6/2010 | Winkler |
| 2010/0133820 A1 | | 6/2010 | Tsao |
| 2010/0143096 A1 | * | 6/2010 | Carosi ...................... F03D 3/02 |
| | | | 415/60 |
| 2010/0158673 A1 | | 6/2010 | Keene |
| 2010/0237626 A1 | | 9/2010 | Hamner |
| 2010/0244453 A1 | | 9/2010 | Dornan |
| 2010/0254798 A1 | * | 10/2010 | Tutt ...................... F03D 3/0436 |
| | | | 415/4.2 |
| 2010/0254799 A1 | | 10/2010 | Caines |
| 2010/0301609 A1 | | 12/2010 | Kim et al. |
| 2010/0314876 A1 | * | 12/2010 | Frayne .................... F03D 7/026 |
| | | | 290/44 |
| 2011/0018280 A1 | | 1/2011 | Mahaffy et al. |
| 2011/0025070 A1 | | 2/2011 | Price |
| 2011/0062717 A1 | | 3/2011 | Price, Jr. |
| 2011/0103942 A1 | | 5/2011 | Green et al. |
| 2011/0107684 A1 | | 5/2011 | Flores |
| 2011/0116932 A1 | | 5/2011 | Poon |
| 2011/0140449 A1 | * | 6/2011 | Huang .................... F03D 3/067 |
| | | | 290/55 |
| 2011/0163551 A1 | * | 7/2011 | King ...................... F03D 3/005 |
| | | | 290/55 |
| 2011/0200436 A1 | | 8/2011 | Wu et al. |
| 2011/0309634 A1 | * | 12/2011 | Syrovy .................... F03D 5/02 |
| | | | 290/55 |
| 2011/0318161 A1 | | 12/2011 | Miljkovic |
| 2012/0019002 A1 | | 1/2012 | Lee |
| 2012/0080886 A1 | | 4/2012 | Ju |
| 2012/0148403 A1 | | 6/2012 | Flaherty et al. |
| 2012/0242087 A1 | | 9/2012 | Ruder |
| 2012/0274076 A1 | * | 11/2012 | Kelaiditis ............... F03D 3/062 |
| | | | 290/55 |
| 2013/0001950 A1 | * | 1/2013 | Armstrong .............. F03D 3/065 |
| | | | 290/55 |
| 2013/0043082 A1 | | 2/2013 | Tran |
| 2013/0045080 A1 | * | 2/2013 | Kirke ...................... F03D 3/068 |
| | | | 415/53.1 |
| 2013/0285382 A1 | * | 10/2013 | Grigg ...................... F03D 3/002 |
| | | | 290/54 |
| 2013/0323056 A1 | | 12/2013 | Su |
| 2013/0336811 A1 | | 12/2013 | Muller et al. |
| 2014/0147274 A1 | | 5/2014 | Longmire et al. |
| 2014/0217738 A1 | | 8/2014 | Lipman |

OTHER PUBLICATIONS

Authorized Officer Copenheaver, Blaine, R., "Written Opinion of the International Searching Authority" mailed Jul. 23, 2015. PCT/US2015/028083. 6 Pages.

"International Search Report and Written Opinion of the International Searching Authority", PCT/US2014/022551. Mailing date of International Search Jul. 1, 2014 (15 pages).

* cited by examiner

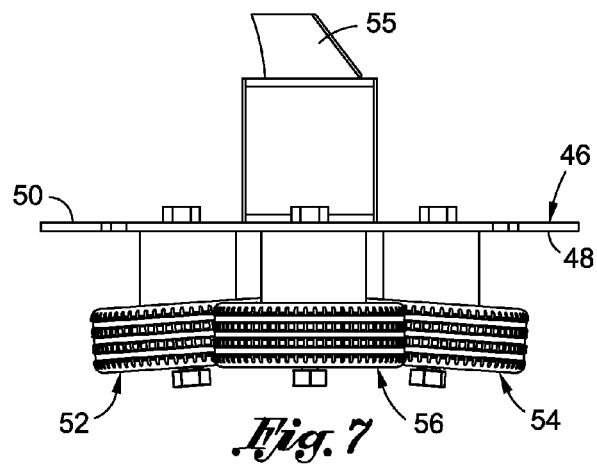
*Fig. 7*
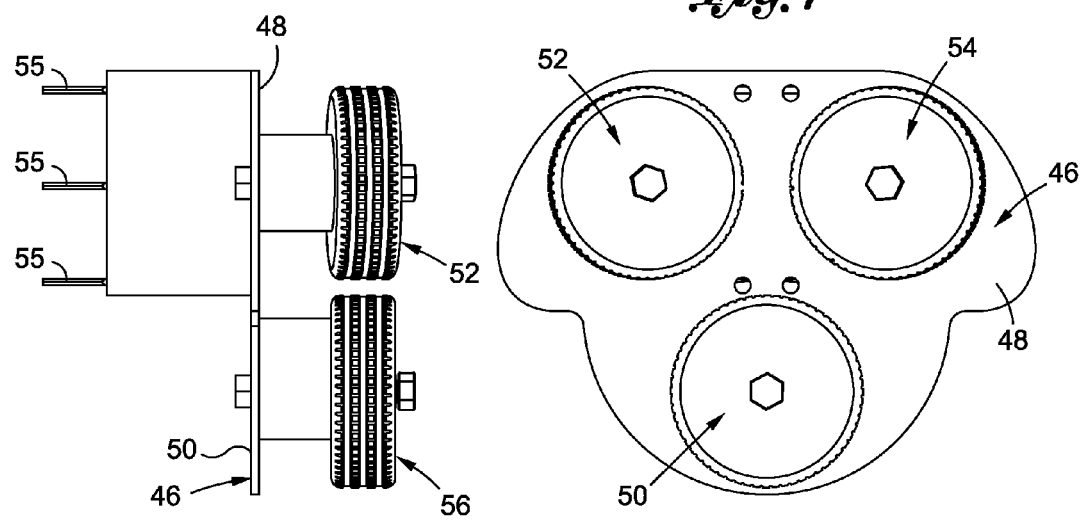
*Fig. 8*    *Fig. 9*
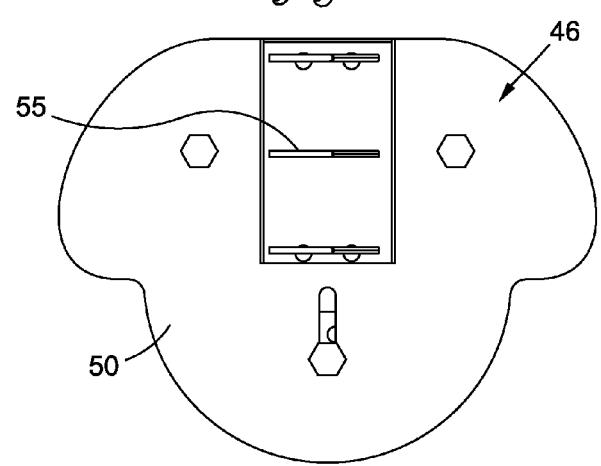
*Fig. 10*

MOUNTABLE WIND TURBINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical field

The present invention relates to a wind turbine used to convert wind forces into electrical energy. More particularly, the present invention relates to a wind turbine and generator adapted to be affixed about an elongate shaft or similar structure.

2. Related Art

The need and demand for renewable energy is increasing as an alternative to traditional fossil fuels and nuclear power. Existing devices and methods adapted to harness renewable sources, such as wind power, may have the unwelcome effect of creating large and noticeable physical footprints on existing landscapes. Existing wind turbines require installation on tall masts with sufficient horizontal and lateral clearance and rights of way and accessibility to an electrical grid. Wind farms that use existing wind turbines may be located in less densely populated areas and may utilize large tracts of valuable land and many times increase the cost of kilowatt hour due the requirement of construction of access to electrical grids. Wind generators located in more densely populated areas may block views, block sunlight, create noise and otherwise may be ascetically undesirable. In addition, existing horizontal and vertical wind turbines can be a danger to certain bird populations.

A common wind turbine structure includes a single large propeller affixed at the top end of a vertical mast. Airflow across the blades, airfoils or the propellers causes rotation activating a generator to produce electricity. Because of the length of the blades and the size of propeller, many times such wind turbines are affixed atop very tall masts making maintenance and repair difficult. The high placement also takes advantage of higher winds having more force to move the massive propeller blades. Also the installation of the masts are expensive and are required to support a significant amount of weight to support both the blades and generator which is typically located at the center of the blades. A conventional propeller type wind turbine with blades also typically rotates perpendicular to wind direction requiring expensive mechanisms to rotate either or both of the forward direction of the propeller, or the angle of the propeller blades.

Most conventional wind turbines require energy to start rotation of the wind turbine. In most cases, the energy is drawn from the existing power grid, which thereby reduces the overall energy production of the wind turbine.

Accordingly, there is a need in the art for devices and methods to generate renewable energy from wind and airflow forces that has a minimized physical impact on the livable landscape and environment and which can capitalize on existing infrastructure and electrical grid interfaces. Also, there is a need in the art for devices and methods to create electricity from wind flow forces that minimize adjustments in the turbine orientation decreasing the complexity of the wind turbines and decreasing costs of manufacture, maintenance and control. Furthermore, there is a need in the art for devices and methods of generating renewable energy from wind and fluid forces with minimal or zero energy drawn from an existing energy grid.

BRIEF SUMMARY

The present invention relates to a mountable wind turbine adapted to take advantage of existing infrastructure as it can be attached and retrofitted to existing structures such as light poles, power poles, water towers, traffic light arms, existing wind turbine masts, billboards, communications towers and similar existing structures. Because the device can be retrofitted onto existing structures that have pre-existing access to electric grid, the wind turbine of the present invention can be utilized with significant costs savings over a wind turbine that requires its own mast structure, real-estate plot and constructed power grid access. In addition, the wind turbine of the present invention additionally provides the advantage of potentially power devices associated with the structure to which it is attached such as a traffic light on a light pole, equipment on a communications tower, traffic light or alternative to provide power to one or more battery storage units that provides back up power.

In accordance with one aspect of the present disclosure, a wind turbine is configured to be mountable to a support post and includes a first support element positioned around a central axis and configured to be connectable to the support post. The first support element includes a first track which encircles the central axis. A fan assembly is engaged with the first support element and is rotatable relative to the first support element. The fan assembly includes a plurality of first trolleys each being coupled to the first support element and spaced relative to each other. The plurality of first trolleys are traversable along the first track to cause rotation of the fan assembly relative to the first support element. A plurality of fan blades are coupled to respective ones of the plurality of first trolleys. At least one off-axis electrical generator is engaged with the fan assembly and includes at least one rotating gear driven by at the fan assembly when the fan assembly rotates relative to the first support element.

The off-axis generator may also be driven by a belt or other drive mechanisms known in the art.

The first support element may be disposed completely around the central axis. Furthermore, the first support track may completely encircle the central axis.

The wind turbine may further include a second support element coupled to the fan assembly, with the second support element positioned around the central axis and having a second track which encircles the central axis. A plurality of second trolleys may be coupled to the second support element and spaced relative to each other, with the plurality of second trolleys being traversable along the second track. Each fan blade may be coupled to respective ones of the plurality of second trolleys.

The first support element may include a primary wall and an end wall extending from the primary wall. Each first trolley may include a pair of wheels disposed on opposed sides of the end wall.

The first support element may include a rounded tube, quadrangular tube or channel, an I-beam or other configurations known in the art. Each first trolley may include at least one wheel engaged with the first support element in spaced relation to each other.

The wind turbine may additionally include a support frame coupled to the first support element and configured to be circumferentially engageable with a support post. The support frame may include a generally quadrangular center opening adaptable to receive the support post. The support frame may include a generally circular center opening adaptable to receive the support post.

The fan assembly may include a mounting element coupled to the plurality of trolleys and engaged with the electrical generator. The electrical generator may include a generator wheel engaged with the mounting element, wherein rotation of the mounting element about the central axis causes rotation of the generator wheel. The generator wheel may include a circumferential groove and the mounting element may include a rib engageable with the circumferential groove.

A solar panel may be in operative communication with the fan assembly and configured to convert solar energy into electrical energy usable for rotating the fan assembly. The wind turbine may additionally include a rechargeable battery in electrical communication with the solar panel to receive and store electrical energy generated by the solar panel. A motor may be in electrical communication with the rechargeable battery and in operative communication with the fan assembly. The motor may receive electrical energy from the rechargeable battery. The motor may be configured to rotate the fan blade housing. The motor may be driven by energy that is not drawn from an existing energy grid.

A controller may be operatively coupled to the motor and configured to selectively transition the motor between ON and OFF configurations. The controller may transition the motor to the ON configuration when the ambient wind speed is less than 5 miles per hour, the controller transitioning the motor to the OFF configuration when the ambient wind speed is greater than 5 miles per hour.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 is a bottom view of the trolley shown in FIG. 5;

FIG. 8 is a an end view of the trolley shown in FIG. 5;

FIG. 9 is a front view of the trolley shown in FIG. 5;

FIG. 10 is a rear view of the trolley shown in FIG. 5;

Common reference numerals are used throughout the drawings and the detailed description to indicate the same elements.

DETAILED DESCRIPTION

Figure 1:
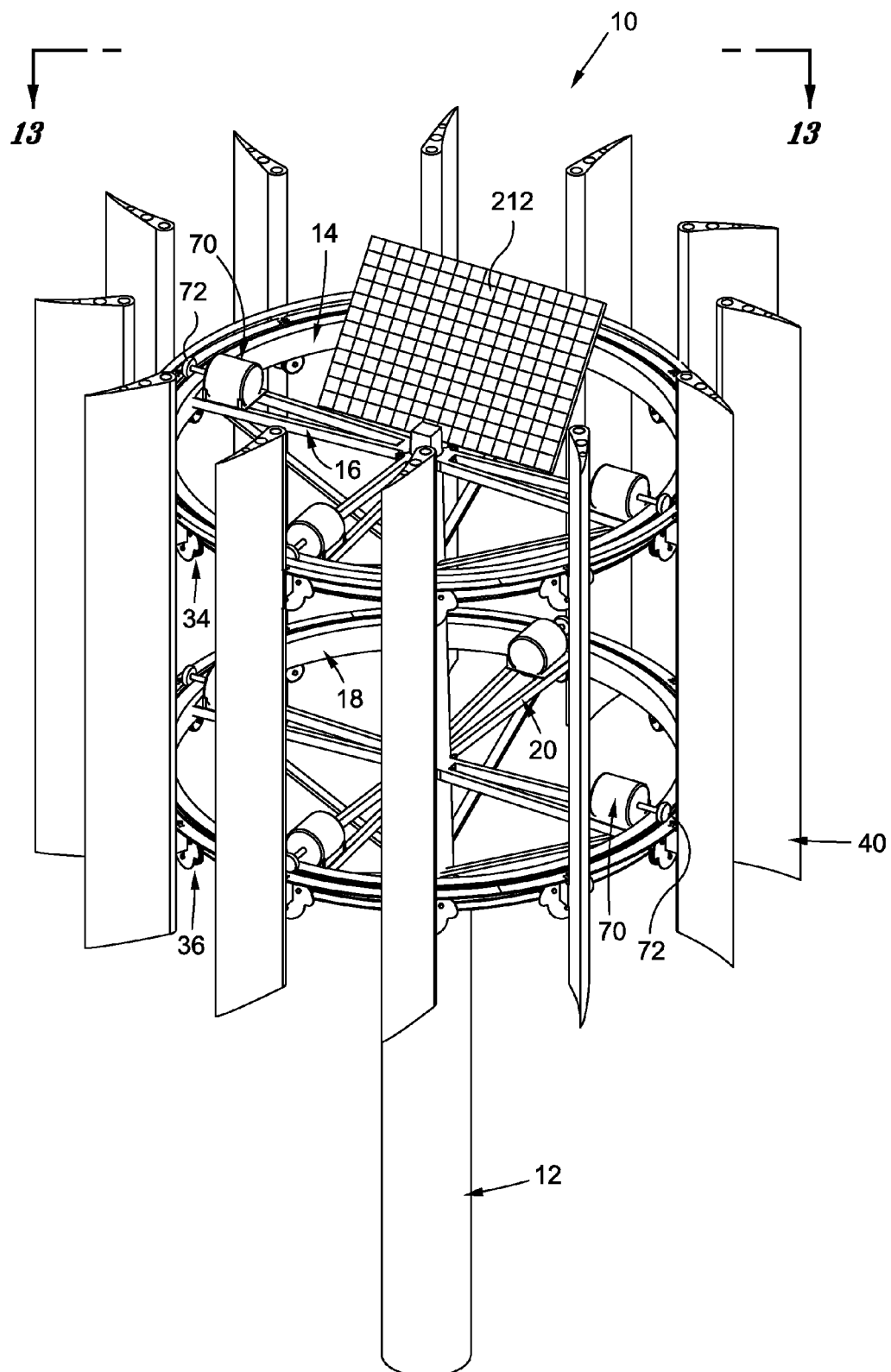
FIG. 1 is an upper perspective view of a first embodiment of a mountable wind turbine.
Figure 2:
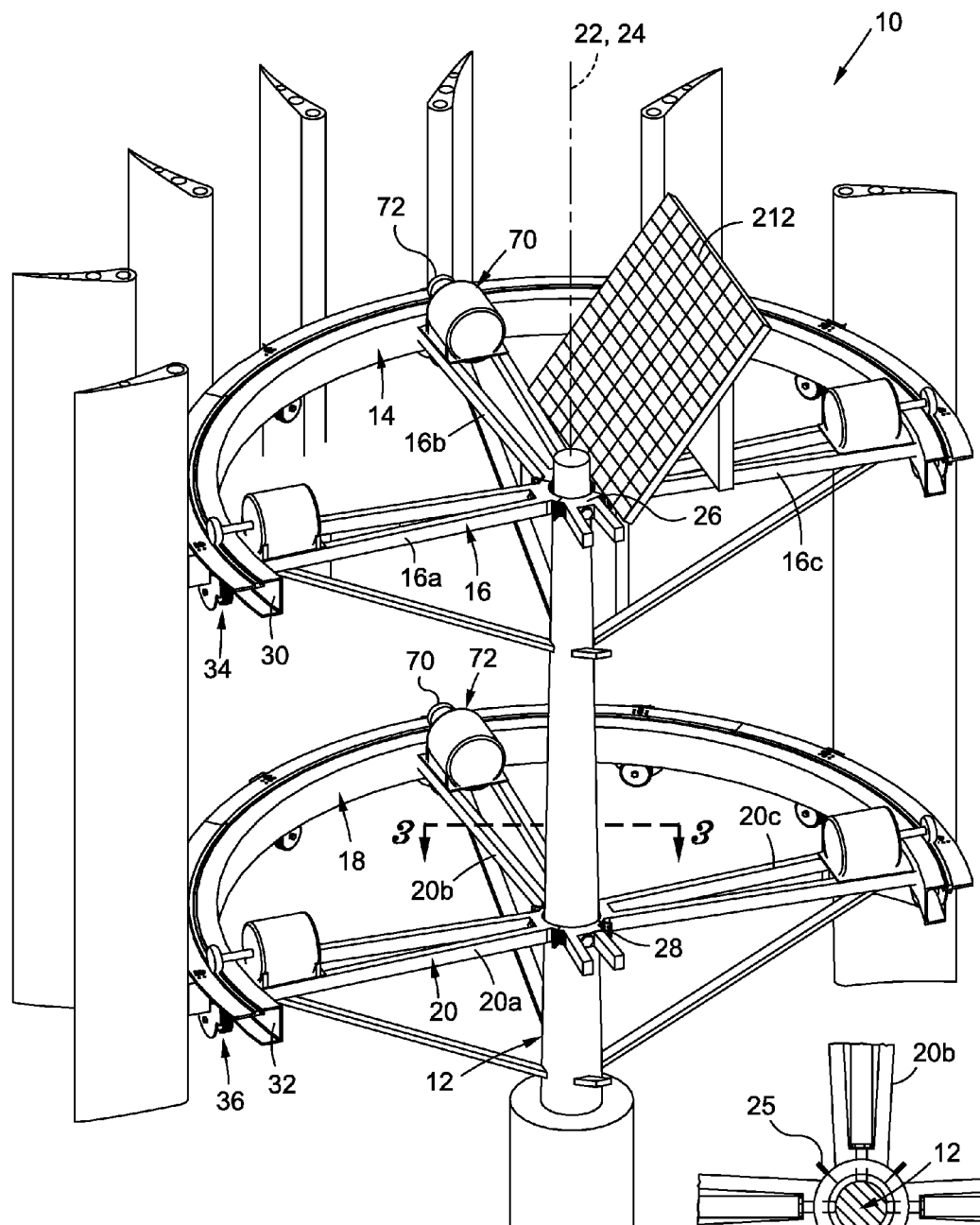
FIG. 2 is a cutaway upper perspective view of the turbine depicted in FIG. 1.
Figure 3:
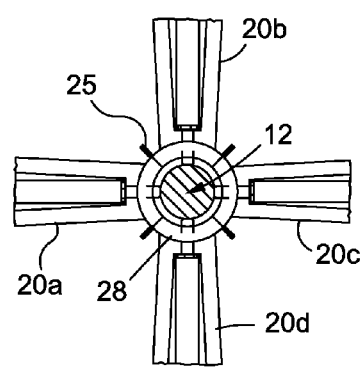
FIG. 3 is a partial top view of the turbine engaged with a mounting post.

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first, second, and the like are used solely to distinguish one element from another without necessarily requiring or implying any actual such relationship or order between such elements.

Existing structures such as light poles, traffic light arms, communication towers, wind turbine masts, chimneys and smoke stacks are commonplace in the modern landscape in both rural and urban communities. In most instances, these types of structures have existing access to the power grid associated with the structure's function or devices attached to the structures. Various aspects of the mountable wind turbine of the present invention takes advantage of existing infrastructure as the wind turbine can be attached and retrofitted to existing structures such as light poles, power poles, water towers, traffic light arms, existing wind turbine masts, billboards, support structures, communications towers and similar existing structures. Because the device can be retrofitted onto existing structures that have pre-existing access to an electric grid, the wind turbine of the present invention can be utilized with significant costs savings over a wind turbine that might require its own mast structure, real-estate plot and/or constructed power grid access. In addition, the wind turbine of the present invention additionally provides the advantage of potentially powering devices associated with the structure to which it is attached such as a traffic light on a light pole, equipment on a communications tower, traffic light or provide power to battery storage unit associated with such devices that can be used to store a charge.

Referring now to the FIGS. 1-13, wherein the showings are for purposes of illustrating a preferred embodiment of the present invention only, and are not for purposes of limiting the same, there is depicted a first embodiment of a wind turbine 10 specifically configured and adapted to be mountable to a support post 12. The support post 12 may include the aforementioned existing infrastructure or other support structures specifically adapted to support the wind turbine 10, such as support structures specifically designed and constructed for use with the wind turbine 10. The wind turbine 10 is "mountable" to the support post 12 due to the wind turbine's ability to be selectively attached and secured to the support post 12.

The wind turbine 10 generally includes a "fixed assembly" that when attached to the support post 12, remains generally stationary relative to the support post 12, and a rotating "fan assembly" 38 (see FIG. 12) which when attached to the support post 12, is capable of being driven by the wind to rotate relative to the support post 12 and the fixed assembly. The fixed assembly generally includes first and second support elements 14, 18 engageable with the rotating fan assembly 38, as well as first and second support frames 16, 20 interconnecting respective ones of the first and second support elements 14, 18 to the support post 12. The rotating fan assembly 38 generally includes a plurality of first and second trolleys 34, 36 moveably coupled to respective ones of the first and second support elements 14, 18, as well as a plurality of fan blades 40 coupled to the first and second trolleys 34, 36.

The wind turbine 10 is disposed about a central axis 22, which according to one embodiment, is aligned with the support post 12 and a rotation axis 24 about which the rotating assembly 38 may rotate. The first support element 14 is positioned around the central axis 22 and is configured to be connectable to the support post 12. In the exemplary embodiment, the first support element 14 defines a generally circular, ring-like configuration that is centered around the central axis 22, although it is understood that the first support element 14 may define other configurations without departing from the spirit and scope of the present invention.

The first support frame 16 is coupled to the first support element 14 and is configured to be circumferentially engageable with the support post 12. According to one embodiment, the first support frame 16 includes a plurality of support arms 16a-d (see FIG. 11) extending outward from a central engagement body 26. The support arms 16a-d may be formed as separate elements which are configured to be attachable to each other around the support post 12. The central engagement body 26 is engageable with the support post 12 and defines an opening sized to receive a portion of the support post 12. The central engagement body 26 may define a wide range of shapes and sizes which correspond to the support post 12. For instance, the central engagement body 26 may define a quadrangular opening, circular opening, triangular opening or any other shape that is complimentary to the support post 12.

According to one embodiment, the first support frame 16 is circumferentially engageable with the support post 12 due to the ability of the first support frame 16 to exert a radially inward force on an external portion of the support post 12 for securing the first support frame 16 to the support post 12. For instance, the first support frame 16 may include a plurality of adjustable screws 25 (see FIG. 3) which may be advanced into the support post 12 or against the support post 12 for mounting the wind turbine 10 to the support post 12.

The second support element 18 is similar to the first support element 14 and is connected to the support post 12 via a second support frame 20. According to one embodiment, the configuration of the second support element 18 is similar to the first support element 14, and the configuration of the second support frame 20 is similar to the first support frame 16. Along these lines, the second support frame 20 is coupled to the second support element 18 and is configured to be circumferentially engageable with the support post 12. In the exemplary embodiment, the second support frame 20 includes a plurality of support arms 20a-d extending outward from a central engagement body 28. The support arms 20a-d may be formed as separate elements which are configured to be attachable to each other around the support post 12. The central engagement body 28 is engageable with the support post 12 and defines an opening sized to receive a portion of the support post 12. The central engagement body 28 may define a wide range of shapes and sizes which correspond to the support post 12. For instance, the central engagement body 28 may define a quadrangular opening, circular opening, triangular opening or any other shape that is complimentary to the support post.

According to one embodiment, the second support frame 20 is circumferentially engageable with the support post 12 due to the ability of the second support frame 20 to exert a radially inward force on an external portion of the support post 12 for securing the second support frame 20 to the support post 12. For instance, the second support frame 20 may include a plurality of adjustable screws 25 which may be advanced into the support post 12 or against the support post 12 for mounting the wind turbine 10 to the support post 12.

The first and second support frames 16, 20 may be formed from a strong durable material, such as metal or other materials known in the art. The support frames 16, 20 are capable of supporting the wind turbine 10 in high wind conditions, such as wind conditions in excess of 60 MPH. In this respect, one embodiment of the support frame 16, 20 may be rigid to withstand forces caused by the wind, while other implementations of the support frames 16, 20 may be flexible, allowing for a degree of flexion or bending in windy conditions (similar to a tree branch).

The exemplary embodiment shows a wind turbine 10 having first and second support elements 14, 18 for supporting the rotating assembly 38. However, it is expressly contemplated that other embodiments of the wind turbine 10 may include only a single support element, while other embodiments may have greater than two supports elements without departing from the spirit and scope of the present invention.

The first support element 14 defines a first track 30 and the second support element 18 defines a second track 32, with each track encircling the central axis 22. The fan assembly 38 is coupled to the first and second support elements 14, 18 within the first and second tracks 30, 32. In particular, the fan assembly 38 includes a plurality of fan blades 40 coupled to a plurality of first and second trolleys 34, 36. The first trolleys 34 are coupled to the first support element 14 and are traversable along the first track 30, while the second trolleys 36 are coupled to the second support element 18 and are traversable along the second track 32. Each fan blade 40 is preferably attached to a respective first trolley 34 and a respective second trolley 36.

Figure 4:
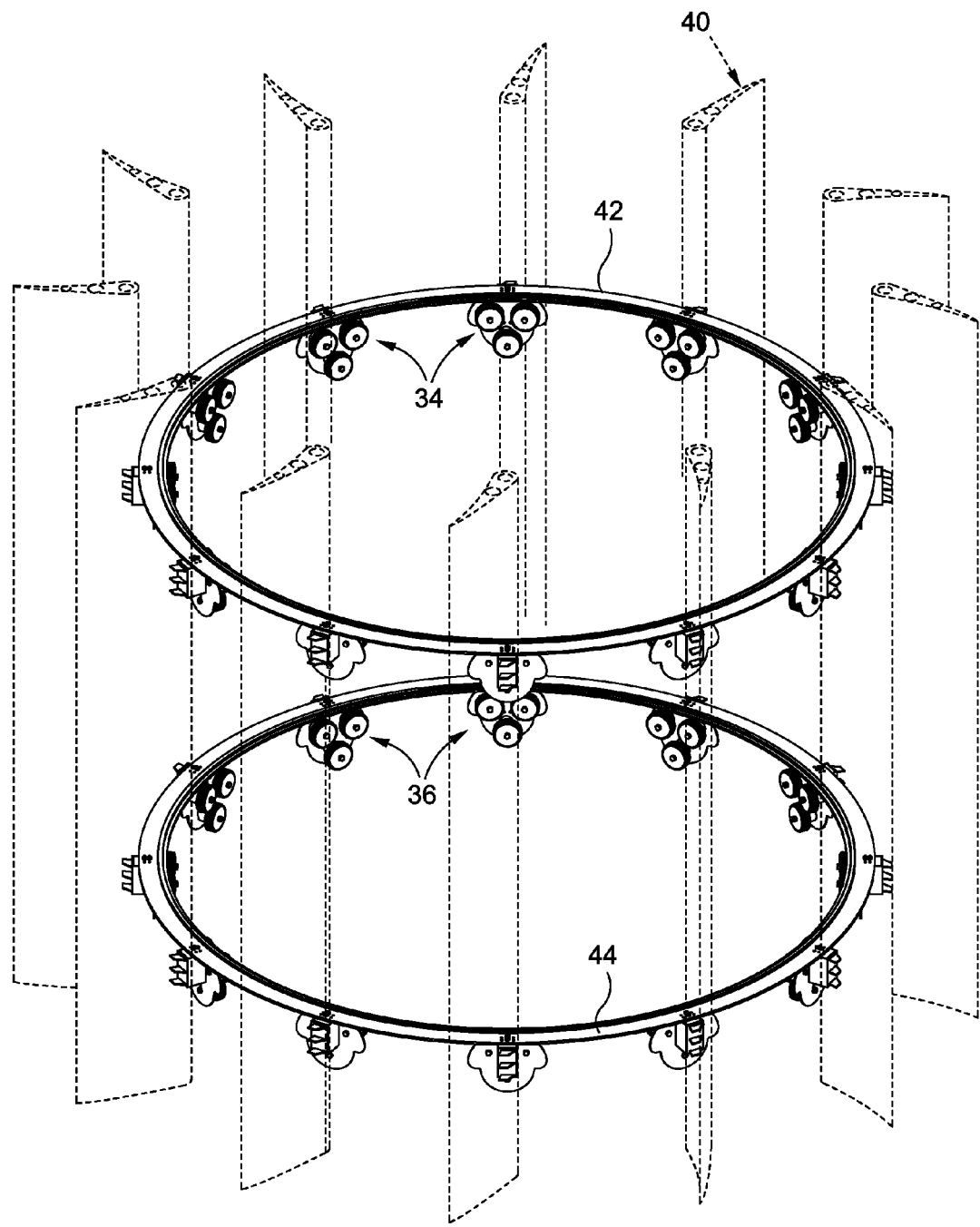
FIG. 4 is an upper perspective view of one embodiment of a plurality of trolleys coupled to a plurality of fan blades (shown in phantom) via a pair of mounting elements.
Figure 5:
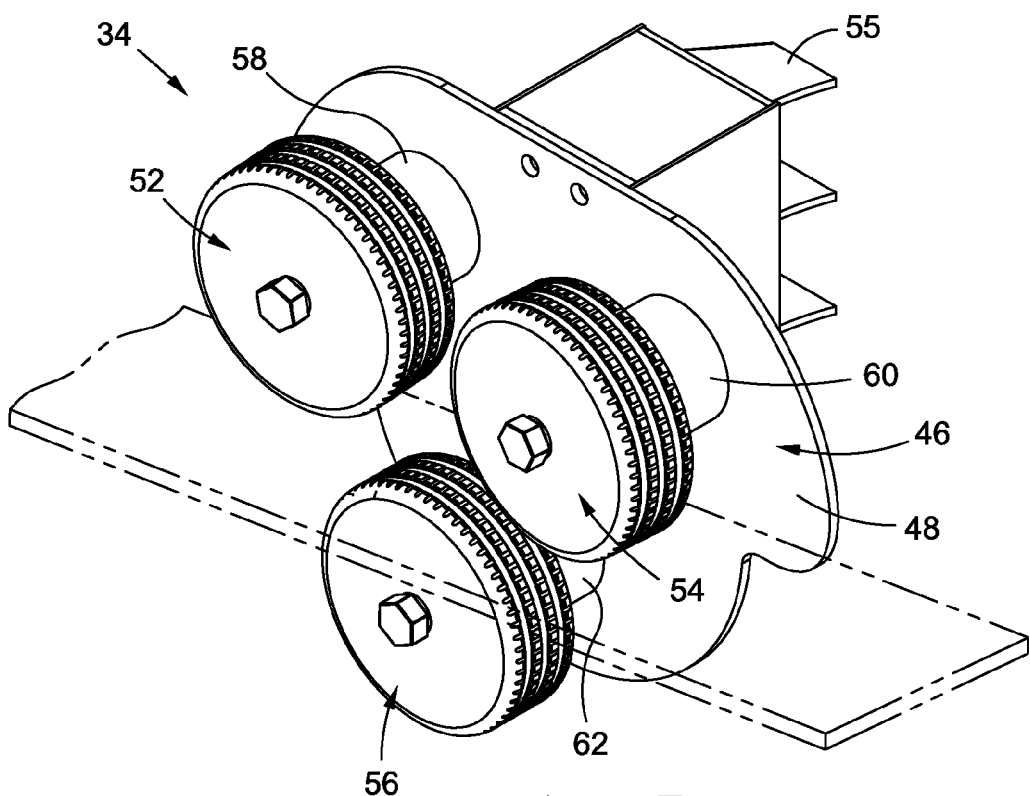
FIG. 5 is a front upper perspective view of a trolley.
Figure 6:
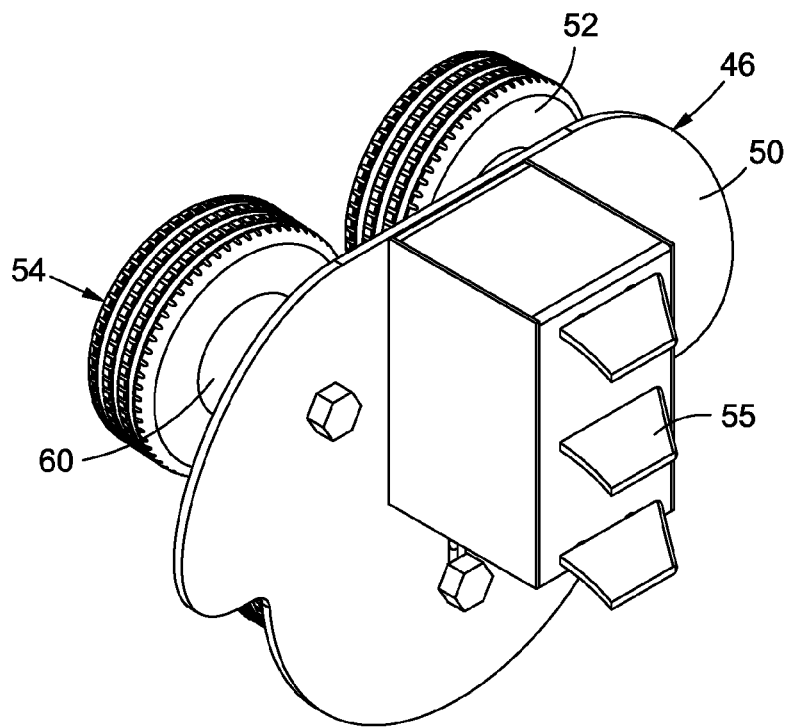
FIG. 6 is a rear upper perspective view of the trolley shown in FIG. 5.
Figure 11:
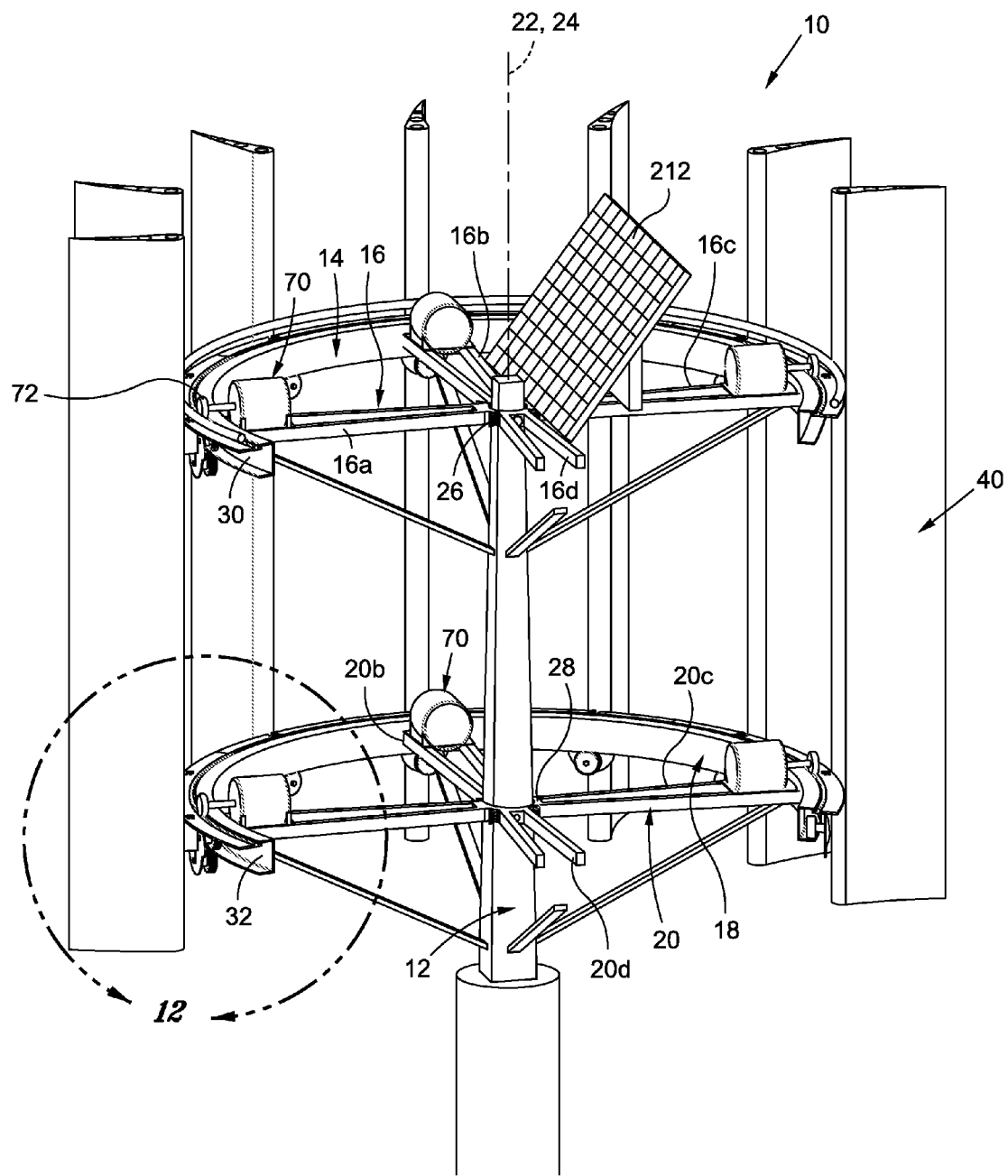
FIG. 11 is a cutaway upper perspective view of the wind turbine depicted in FIG. 1.

According to one embodiment, and referring to FIG. 4, the first trolleys 34 are interconnected via a first mounting element 42 and the second trolleys 36 are interconnected via a second mounting element 44. The exemplary first and second mounting elements 42, 44 are circular, ring-like structures disposed about the central axis 22. It is contemplated that each mounting element 42, 44 may include a continuous ring, or may be subdivided into separate segments. Adjacent fan blades 40 are interconnected to each other via the first and second mounting elements 42, 44.

Referring now specifically to FIGS. 5-10, there is depicted several views of a first trolley 34. Although FIGS. 5-10 depict a first trolley 34, it is understood that the second trolleys 36 are identical to the first trolleys 34, and therefore, the following explanation of the first trolley 34 also applies to the second trolleys 36.

Each trolley 34 includes a base plate 46 having opposed first and second faces 48, 50. A plurality of wheels 52, 54, 56 are coupled to the base plate 46 and are spaced from the base plate 46 by respective axles 58, 60, 62. The wheels 52, 54 are coupled to the base plate 46 such that the wheels 52, 54 are rotatable along a substantially common first plane, while the wheel 56 is positioned such that it rotates about a separate second plane that is slightly spaced from the first plane. As will be described in more detail below, the placement of the wheels 52, 54, 56 allows the wheels 52, 54 and wheel 56 to roll on opposite sides of the first support element 14.

Each trolley 34 further includes a plurality of attachment fins 55 for attaching the trolley 34 to the corresponding fan blade 40. According to one embodiment, the fan blades 40 are configured to be selectively detachable from the attachment fins 55. The fan blades 40 may also be directly attached to the mounting elements 42, 44. It is also contemplated that the blades 40 may include indicia depicted thereon, such that when the turbine 10 turns, the blades 40 may spell a word or phrase, create an animation, or depict a logo. For instance, if the turbine 10 is used in connection with a private residence, the blades 40 may spell the owner's last name, favorite sports team or alma mater, etc.

Figure 12:
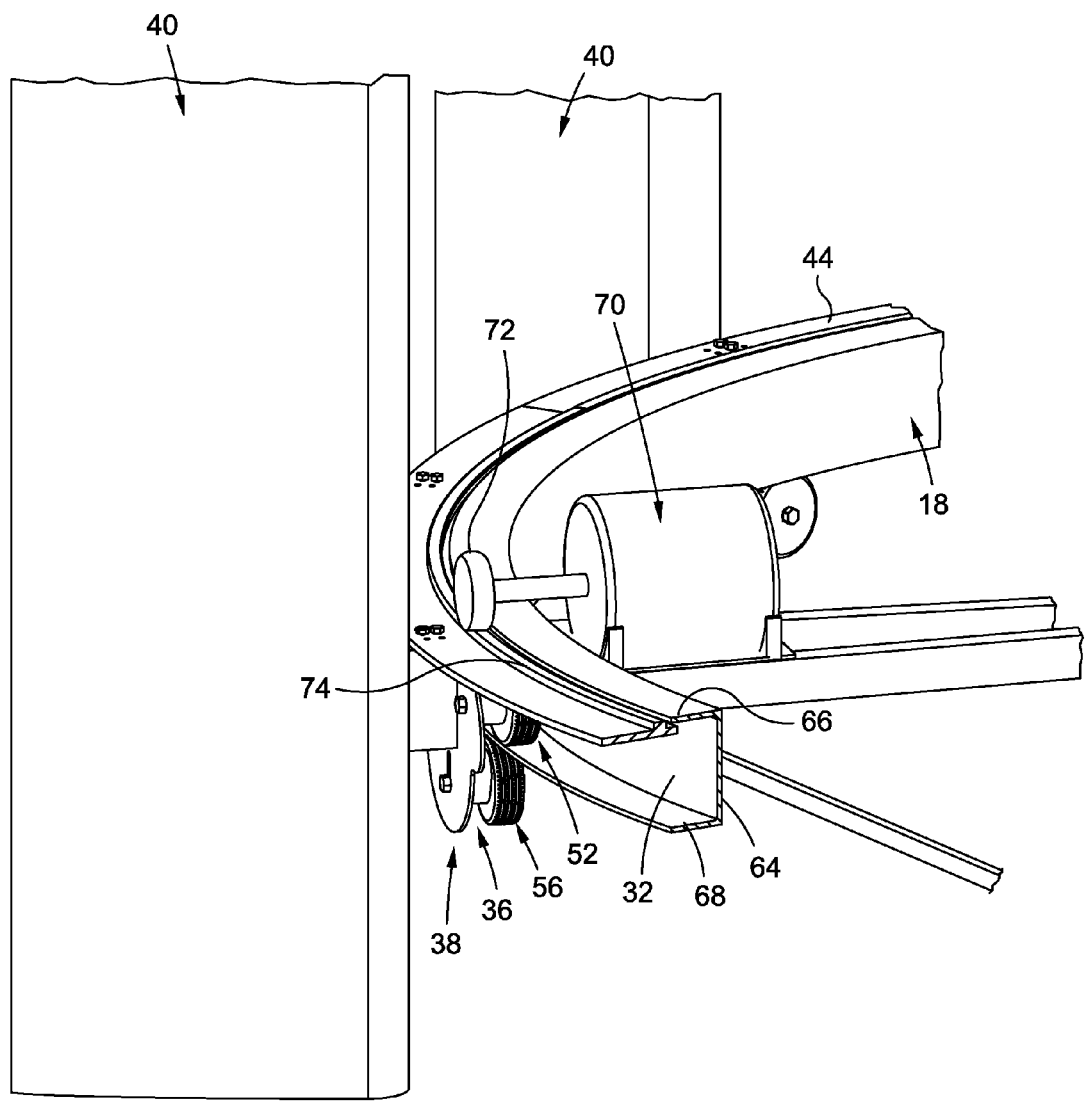
FIG. 12 is a cutaway, partial perspective view of a lower track engaged with an electrical generator.
Figure 13:
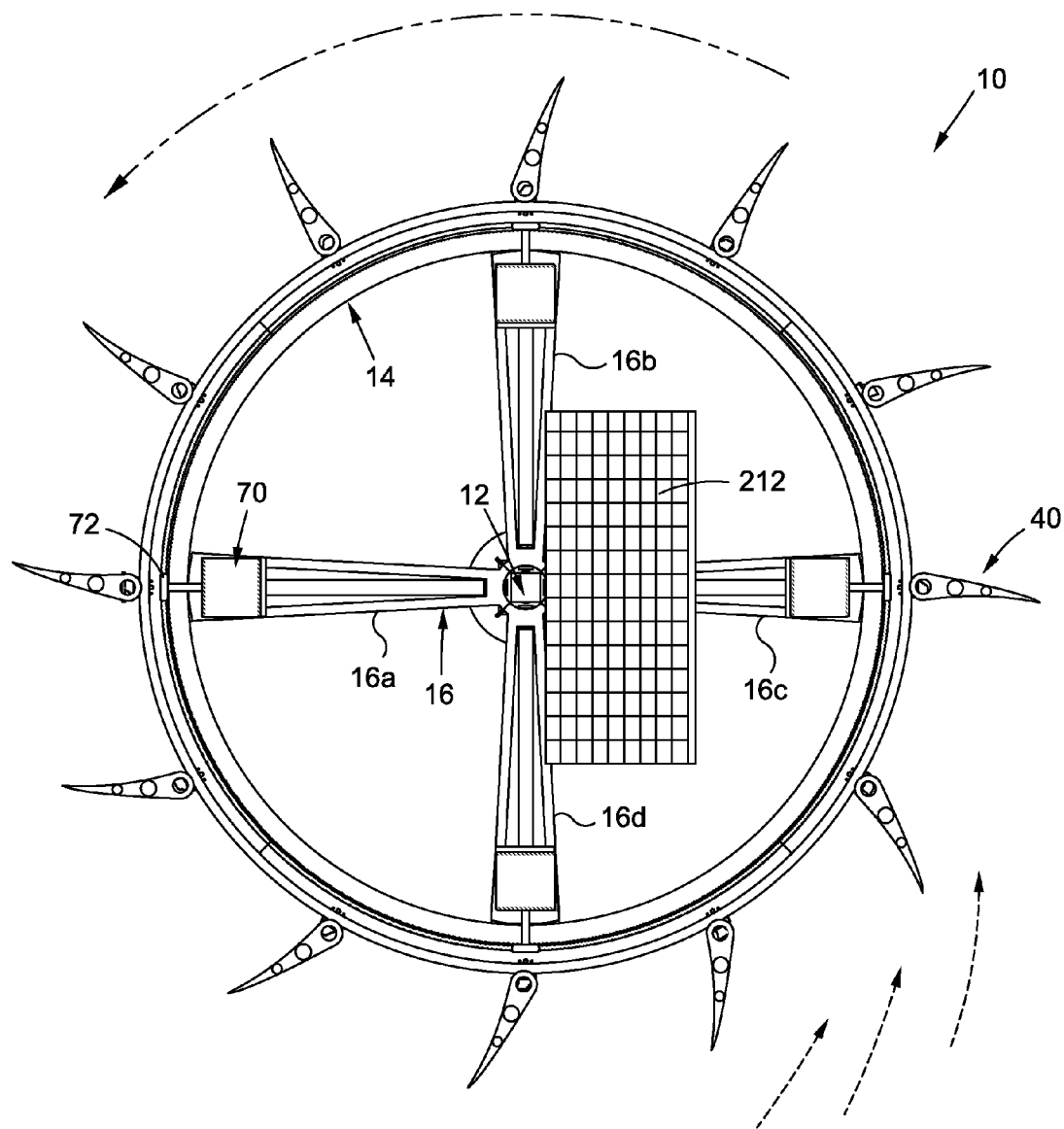
FIG. 13 is a top view of the wind turbine depicted in FIG. 1.
Figure 14:
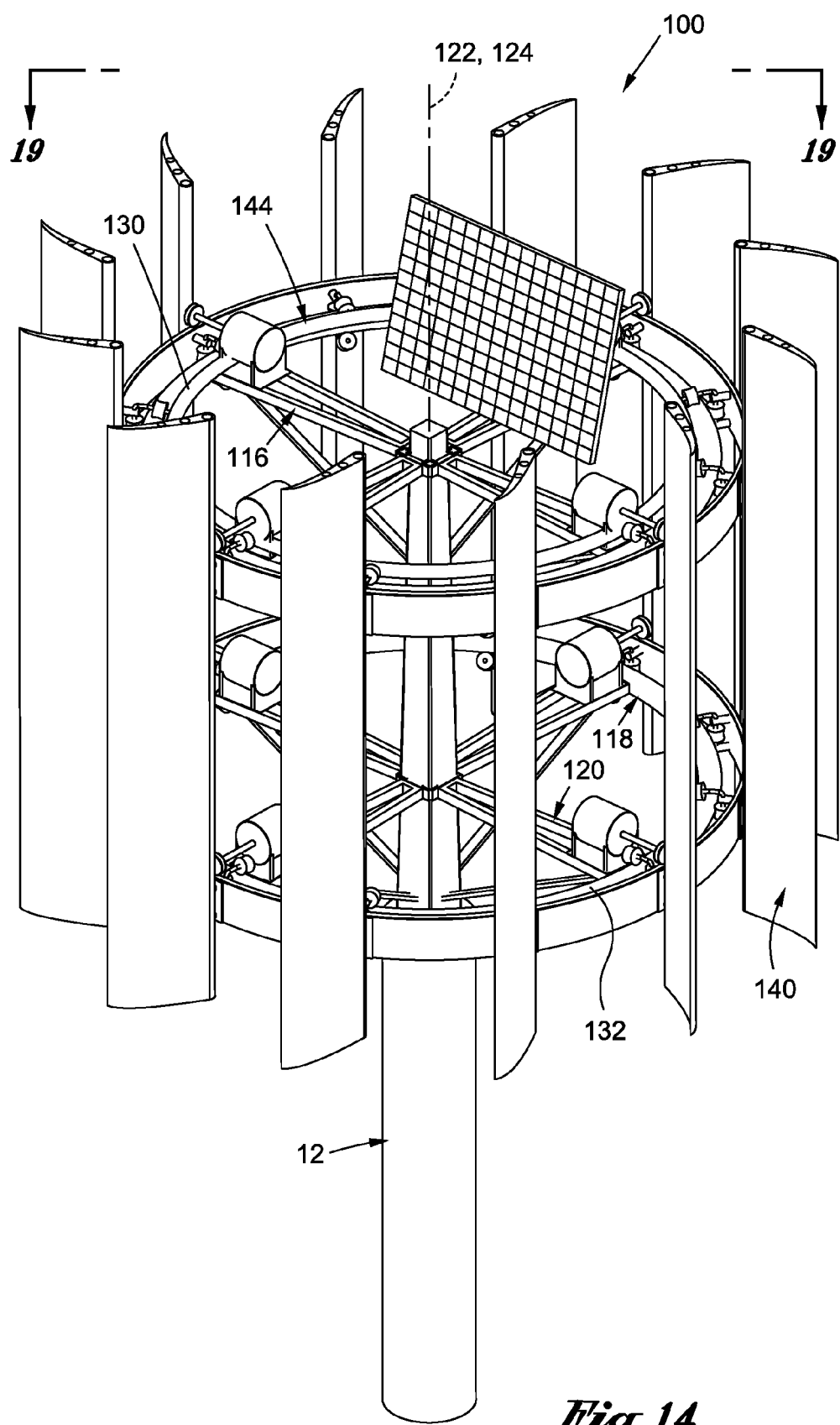
FIG. 14 is an upper perspective view of a second embodiment of the wind turbine.
Figure 15:
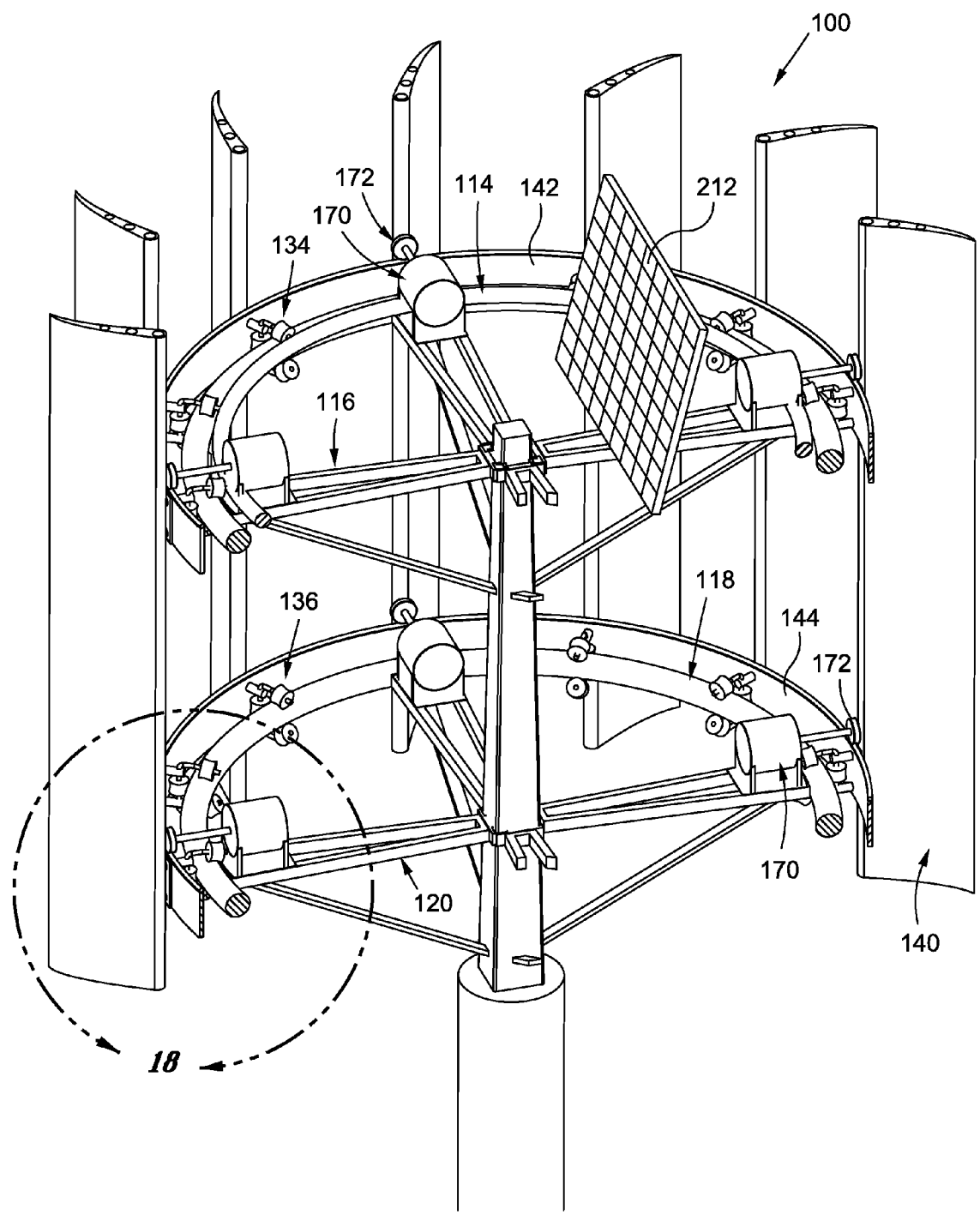
FIG. 15 is a cutaway upper perspective view of the wind turbine depicted in FIG. 14.
Figure 16:
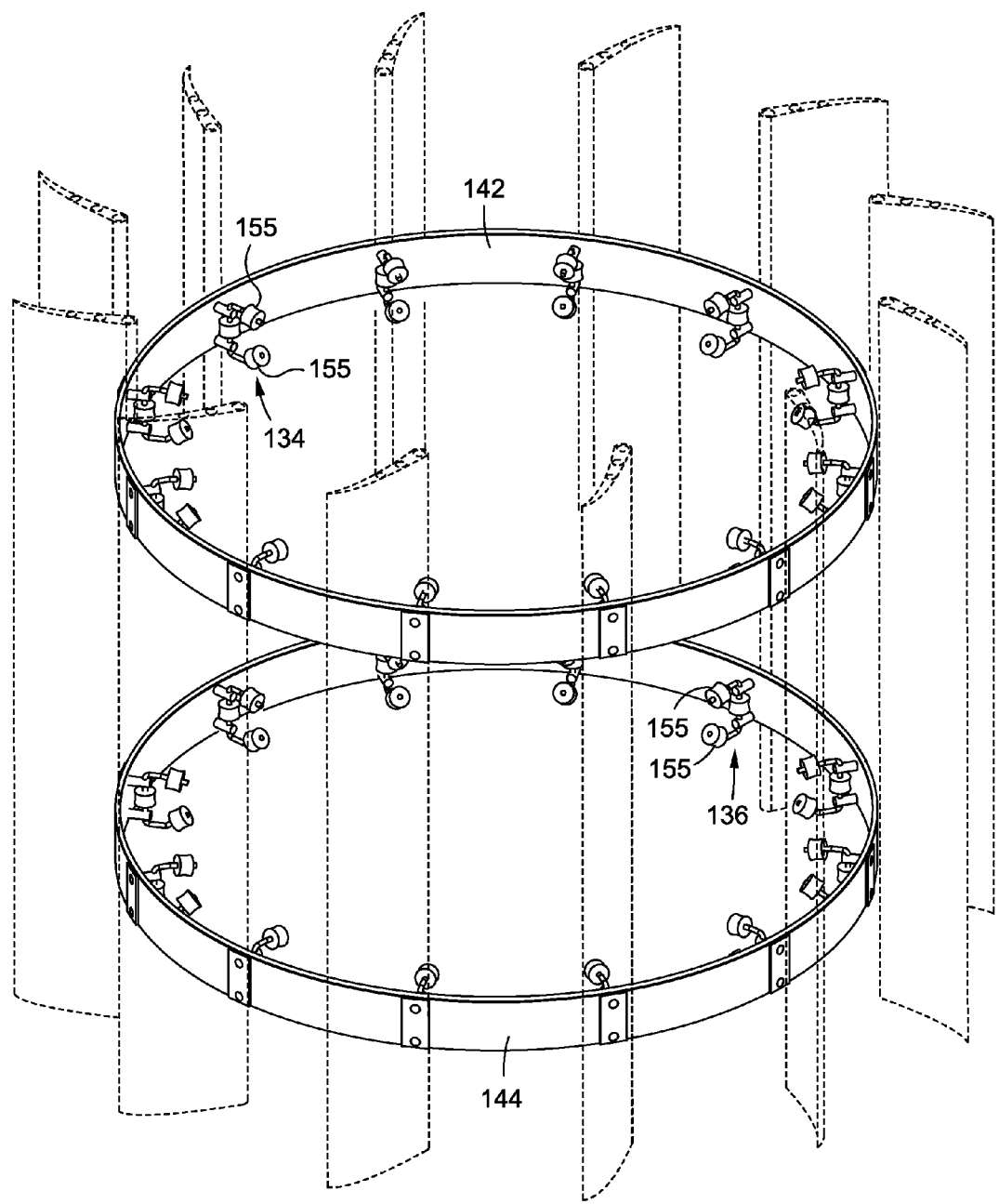
FIG. 16 is an upper perspective view of a plurality of trolleys coupled to a plurality of fan blades (shown in phantom) via a pair of mounting elements.
Figure 17:
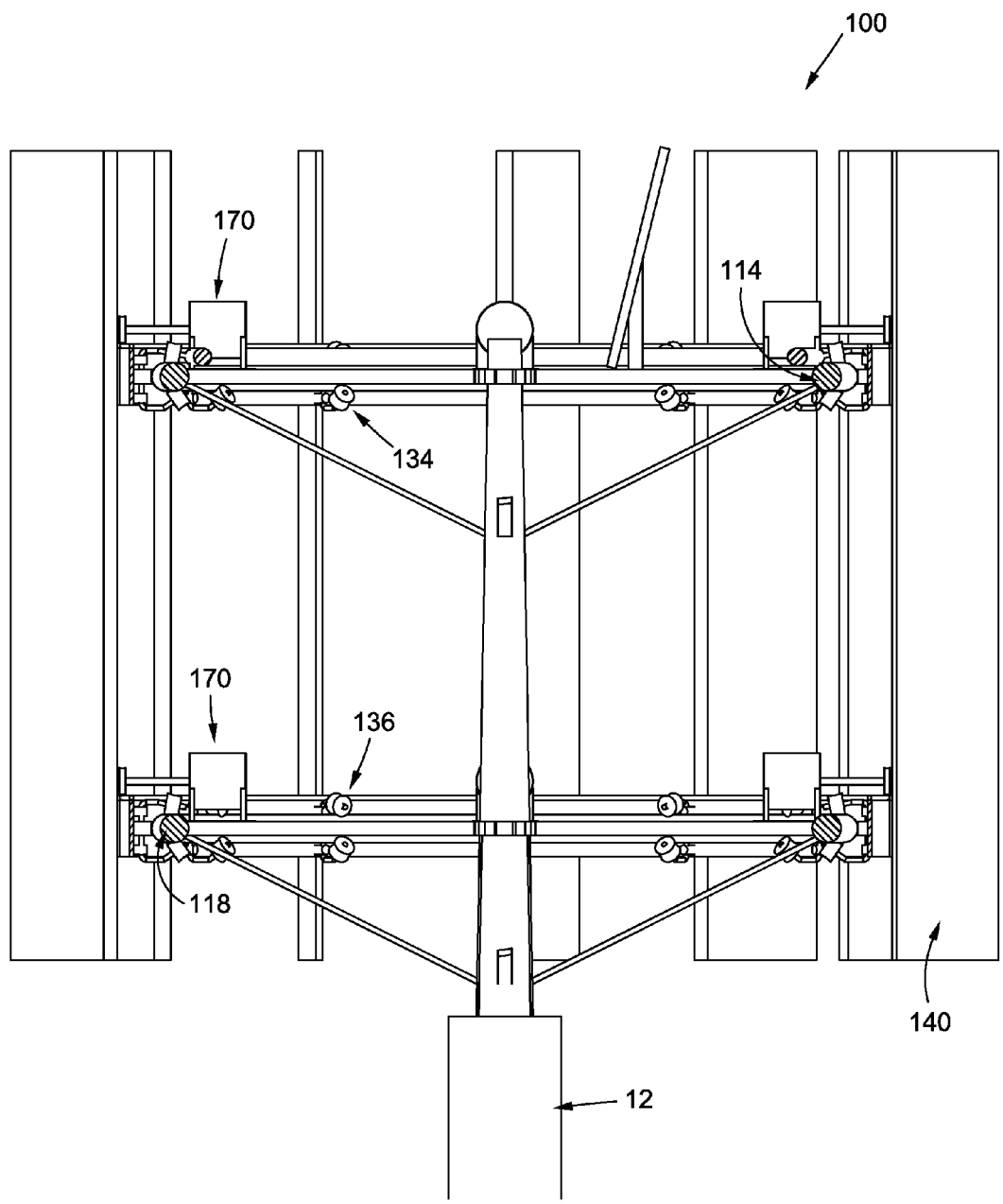
FIG. 17 is a front sectional view of the wind turbine depicted in FIG. 14.
Figure 18:
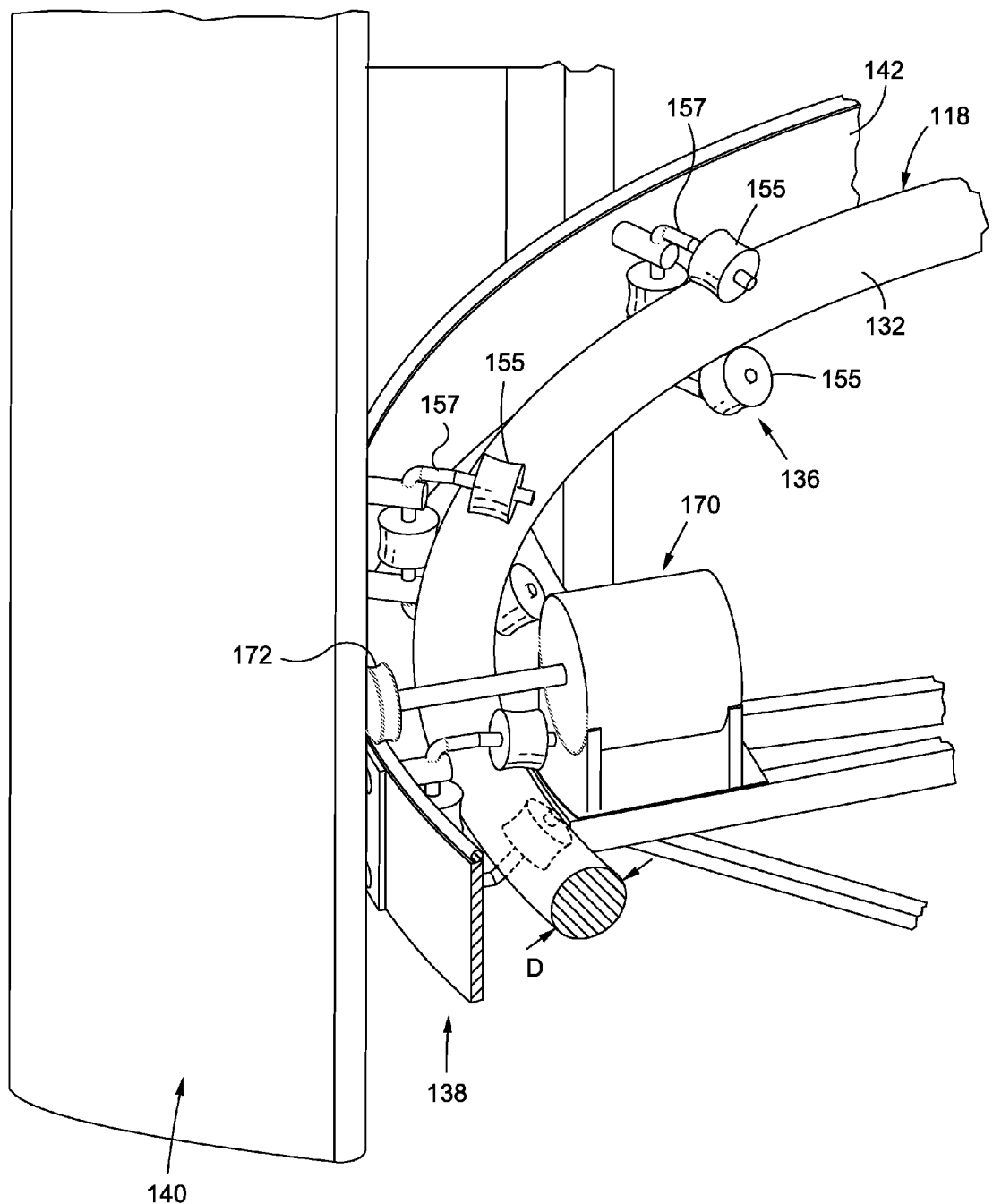
FIG. 18 is a cutaway, partial perspective view of a lower track of the wind turbine shown in FIG. 14 engaged with an electrical generator.
Figure 19:
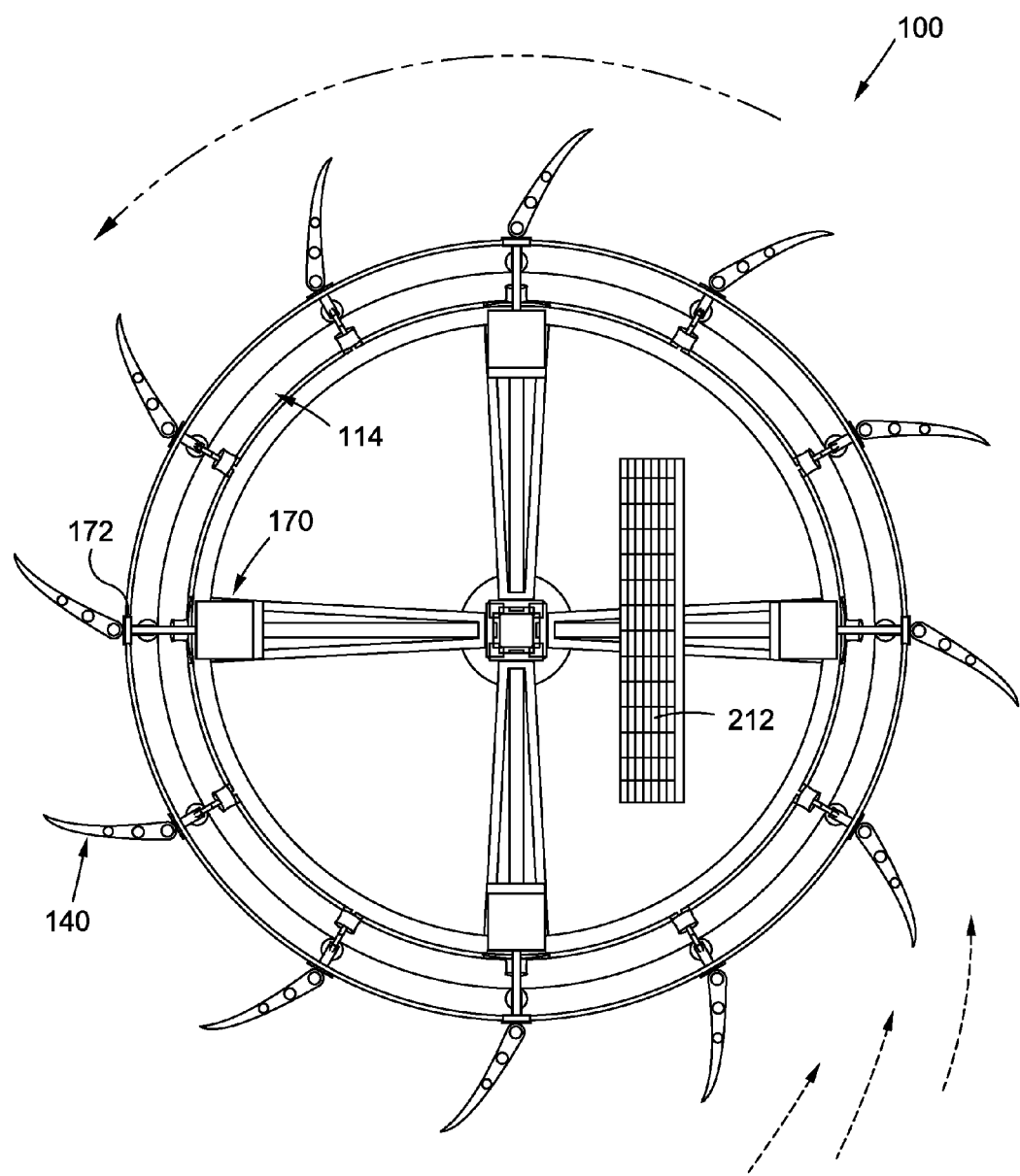
FIG. 19 is a top view of the wind turbine depicted in FIG. 14.

Referring now to FIG. 12, there is depicted an enlarged view of the second trolley 36 along the second track 32. Although the following discussion is focused on the second trolley 36 and the second track 32, the description also applies to the first trolley 34.

The second support element 18 defines a generally C-shaped configuration and includes primary wall 64, a first end wall 66 and an opposing second end wall 68, which collectively define the second track 32. The second trolley 36 is positioned within the second track 32 such that the first wheel 52 and second wheel 54 are disposed on one side of the second end wall 68, while the third wheel 56 is positioned on an opposite side of the second end wall 68. In this respect, the second end wall 68 provides a structure upon which the wheels 52, 54, 56 may roll. The first end wall 66 extends over the wheels 52, 54 to prevent debris from entering the track 32.

Although the exemplary embodiment includes a pair of end walls 66, 68, it is contemplated that other embodiments may include only a single end wall or rolling wall upon which the wheels 52, 54, 56 may roll.

The wind turbine 10 further includes at least one, and preferably a plurality of off-axis electrical generators 70 which are configured to convert rotation of the fan assembly 38 into electrical energy. In the exemplary embodiment, the wind turbine 10 includes four electrical generators 70 operatively engaged with the first mounting element 42 and four electrical generators 70 operatively engaged with the second mounting element 44. Each electrical generator 70 includes a generator wheel 72 which is engaged with the mounting element 44 such that as the mounting element 44 rotates about the rotation axis 24, the generator wheel 72 also rotates. The mounting element 44 may include a rib 74, protrusion or other engagement structure which may enhance the friction or engagement between the mounting element 44 and the generator wheel 72.

The wind turbine 10 is configured such that the fan blades 40 are urged by the wind, which drives the rotating fan assembly 38 around the first and second tracks 30, 32. As the rotating fan assembly 38 rotates, the generator wheel 72 is driven, which in turn causes the generator 70 to generate electrical energy.

It is understood that the generator 70 may be configured such that the main axle of the generator 70 may experience rotational resistance, which may be associated with the conversion of rotation of the axle into electricity. This internal resistance of the generator 70 may inhibit rotation of the wind turbine 10 at startup. Therefore, one embodiment of the wind turbine 10 includes a generator 70 which may be disengaged from the mounting elements 42, 44 until the rotational speed of the wind turbine 10 exceeds a prescribed threshold. In embodiments where the wind turbine 10 includes multiple generators 70, only one generator 70 may be disengaged, or alternatively all of the generators 70 may be disengaged. The generator 70 may be disengaged by moving the generator wheel 72 out of contact with the respective mounting element 42, 44 and maintained in spaced relation to the mounting element 42, 44 until the speed of the wind turbine 10 meets the threshold. The wind turbine 10 may include a control system including the necessary actuating mechanisms, controls and sensors for selectively moving the generator(s) 70 out of engagement with the mounting elements 42, 44 and into engagement with the mounting elements 42, 44.

Referring now to FIGS. 14-19, there is depicted another embodiment of a wind turbine 100 which is mountable to a support post 12. The wind turbine 100 is similar to the wind turbine 10 discussed above, in that the wind turbine 100 includes a "fixed assembly" that when attached to the support post 12, remains generally stationary relative to the support post 12, and a "rotating assembly," which when attached to the support post 12, is capable of being driven by the wind to rotate relative to the support post 12 and the fixed assembly. The primary distinction between the wind turbine 100 shown in FIGS. 14-19 and the wind turbine 10 shown in FIGS. 1-13 lies in the configuration of the first and second support elements 114, 118 and the corresponding first and second trolleys 134, 136. Therefore, the following discussion will focus on the unique features of the wind turbine 100.

The first and second support elements 114, 118 each include a hoop-like body disposed radially outward from central axis 122. The hoop-like body is of a rounded cross sectional configuration (see FIG. 18). According to one embodiment, the hoop-like body is of a substantially circular cross sectional configuration defining a diameter, "D" (see FIG. 18). It is understood that in other embodiments, the hoop-like body may not define a circular cross-sectional configuration, and instead, may include surfaces which are complimentary in shape to the rollers formed on the trolleys, as will be described in more detail below.

The first and second support elements 114, 118 are secured to the support post 12 via corresponding first and second support frames 116, 120, which are similar to the support frames 16, 20 described above.

The first support element 114 defines a first track 130 and the second support element 118 defines a second track 132, with each track 130, 132 encircling the central axis 122. The rotating fan assembly 138 is coupled to the first and second support elements 114, 118. In particular, the rotating fan assembly 138 includes a plurality of fan blades 140 coupled to a plurality of first and second trolleys 134, 136. The first trolleys 134 are coupled to the first support element 114 and are traversable along the first track 130, while the second trolleys 136 are coupled to the second support element 118 and are traversable along the second track 132.

According to one embodiment, the first trolleys 134 are interconnected via a first mounting element 142 and the second trolleys 136 are interconnected via a second mounting element 144. The fan blades 140 are also interconnected via the first and second mounting elements 142, 144, with each fan blade 140 preferably being coupled to both mounting elements 142, 144. The exemplary first and second mounting elements 142, 144 are circular, ring-like structures disposed about the central axis 122 and positioned radially outward of the corresponding first and second support elements 114, 118.

Each trolley 134, 136 includes a plurality of rollers/wheels 155 configured to roll along the external surface of the first or second support elements 114, 118. The rollers 155 are interconnected to each other and the respective mounting element 142, 144 via extension arms 157. In the exemplary embodiment, each trolley 134, 136 includes three rollers 155, each of which engage an external portion of the corresponding support element 114, 118. Preferably, the rollers 155 are substantially equally spaced about the outer circumference of the corresponding support element 114, 118 (e.g., spaced in approximately 120 degree increments). The rollers 155 are rotatably coupled to the support arms 157, which extend radially inward from the corresponding mounting element 142, 144.

The wind turbine 100 further includes at least one, and preferably a plurality of off-axis electrical generators 170 which are configured to convert rotation of the fan assembly 138 into electrical energy. In the exemplary embodiment, the wind turbine 100 includes four electrical generators 170 operatively engaged with the first mounting element 142 and four electrical generators 170 operatively engaged with the second mounting element 144. Each electrical generator 170 includes a generator wheel 172 which is engaged with the mounting element 144 such that as the mounting element 144 rotates about the rotation axis 124, the generator wheel 172 also rotates.

The wind turbine 100 operates in a manner similar to the wind turbine 10 discussed above. In particular, wind drives the fan blades 140, which in turn causes the rotating fan assembly 138 to rotate and drive the generators wheels 172, thereby causing the generator 170 to produce electricity.

According to one embodiment, the wind turbine 100 includes fan blades 140 that a selectively moveable pivotable relative to the corresponding mounting element 142, 144 such that the fan blades 140 may pivot to enhance the aerodynamic effect of the blade 140. A computer controlled pivoting motor may control the position of each fan blade 140 depending on the direction of the wind. For instance, the fan blade 140 may be pivoted to an "open" position to increase the force imparted on the blade 140 from the wind, and a "closed" position to decrease the force imparted on the blade 140 from the wind. Thus, as the wind turbine 100 rotates, the fan blade 140 may pivot between the open and closed positions within a single revolution (e.g., the fan blade 140 may be in the open position when the fan blade 140 is moving in the same direction as the wind, and in the closed position when the fan blade 140 is moving in the opposite direction as the wind). It is also contemplated that in extreme wind conditions, the blades 140 may be maintained in a closed position to prevent damage to the wind turbine 100. The actuator or motor which controls the movement of the fan blades 140 may be any actuator or motor known by those skilled in the art which is capable of controlling the fan blades 140 in the manner described above. Furthermore, the computer control of the actuator or motor may include a processor and related circuitry and sensors for detecting wind direction, wind speeds, turbine speeds or other variables which may be needed to determining an optimal position for the fan blades 140.

Figure 20:
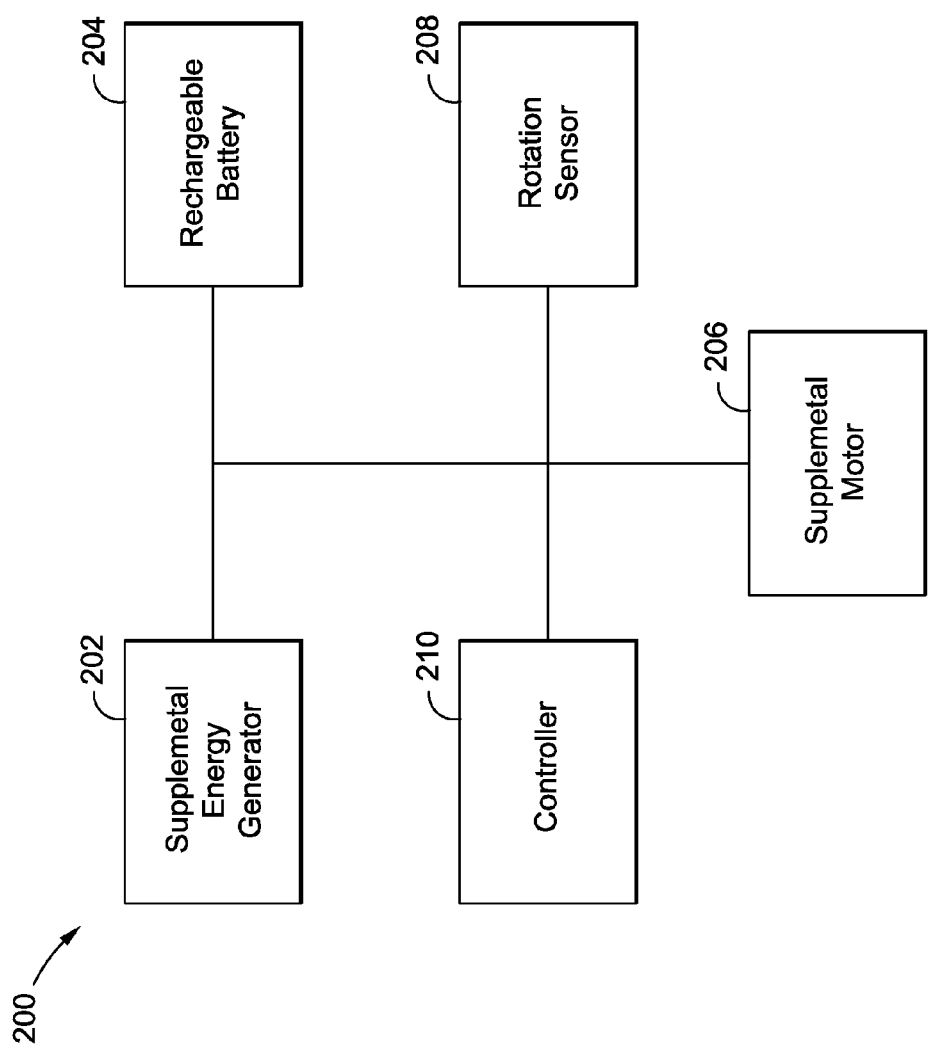
FIG. 20 is a schematic view of a supplement drive system for use with the turbine.

Referring now specifically to FIG. 20, there is shown a schematic of a supplemental drive system 200 specifically configured and adapted for use with a wind turbine 10 for improving performance of the wind turbine 10 in low wind conditions and for rotation startup of the turbine 10. Along these lines, it is understood that the electrical generator 70, 170 typically provides resistance to rotation of the rotating fan assembly 38, 138, which may hinder start-up rotation of the rotating fan assembly 38, 138. As such, various aspects of the invention are directed toward providing a supplemental motive force for reducing the minimum wind speed required to start rotation of the rotating fan assembly 38, 138.

In the embodiment shown in FIG. 20, the wind turbine 10, 100 may include a supplemental drive system 200 which includes a supplemental energy generator 202, a rechargeable battery 204 and a supplemental motor 206. Electrical energy generated by the supplemental energy generator 202 is stored in the rechargeable battery 204, which powers the supplemental motor 206 for providing the motive force required to either start the rotation of the rotating fan assembly 38, 138, or alternatively, to maintain rotation of the rotating fan assembly 38, 138 in low wind conditions. The system 200 additionally includes a rotation sensor 208 for sensing rotation of the rotating fan assembly 38, 138 to detect when the additional motive force is required to rotate the rotating fan assembly 38, 138.

A controller 210 is in operative communication with the supplemental energy generator 202, rechargeable battery 204, rotation sensor 208 and supplemental motor 206 for controlling the supplemental drive system 200. In this respect, the controller 210 may be configured to maintain the supplemental motor 206 in an OFF state when the wind speed is above a prescribed threshold and/or the corresponding rotation speed of the rotating fan assembly 38, 138 is above a prescribed threshold. The controller 210 receives data from the rotation sensor 208 indicative of the rotation speed of the rotating fan assembly 38, 138. When the supplemental motor 206 is in the OFF state, the supplemental motor 206 does not need energy generated by the supplemental energy generator 202, and thus, energy generated by the supplemental energy generator 202 may be stored in the rechargeable battery 204 for later use.

When the rotation speed or wind speed falls below the prescribed threshold, the controller 210 generates a signal which transitions the supplemental motor 206 to an ON state. According to one embodiment, the threshold wind speed may be 5 MPH, although the threshold wind speed may be equal to other wind speeds in other embodiments. When the motor 206 is in the ON state, the motor 206 draws power from the rechargeable battery 204 and/or the supplemental energy generator 202. The controller 210 may be programmed to direct energy to the supplemental motor 206 from either or both of the supplement energy generator 202 and the rechargeable battery 204 based on the power generating levels of the supplemental energy generator 202, the stored power level of the rechargeable battery 204, and the power requirements of the supplemental motor 206.

According to one embodiment, the wind turbine 10, 100 includes a solar panel 212 as a supplemental energy generator 202 and is configured to convert solar energy into electrical energy. The solar panel 212 is coupled to the first support frame 16, 116, although it is understood that the solar panel 212 may also be attached to the second support frame 20, 120 or other adjacent structures without departing from the spirit and scope of the present invention.

During the day, the solar panel 212 generates electrical energy which may be stored in a rechargeable battery 204 included within the wind turbine 10, 100. At startup or in low wind conditions, the electrical energy generated by the solar panel 212 may be used to power a motor 206 which drives the fan assembly 38, 138 to improve efficiency of the turbine 10, 100 in low wind conditions or at rotation startup.

It is contemplated that the supplemental energy generator 202 may employ other energy generation techniques for powering the supplemental motor. For instance, the supplemental energy generator 202 may use magnets/coils for generating energy, wherein the magnet is coupled to the fan assembly 38, 138 and the coil is coupled to the stationary portion of the turbine 10, 100, such that movement of the magnet within the coil may generate electricity.

The supplemental motor 206 may impart resistance on the wind turbine 10, 100 as the wind turbine 10, 100 rotates. Therefore, one embodiment of the supplemental motor 206 is configured to be selectively disengaged from the fan assembly when the rotation of the wind turbine 10, 100 exceeds a prescribed threshold so as to reduce resistance imparted on the fan assembly.

For more information regarding various supplemental energy generator embodiments, as well as other features of the turbine, please refer to U.S. patent application Ser. No. 14/201,681 filed Mar. 7, 2014, the contents of which are expressly incorporated herein by reference.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A wind turbine configured to be mountable to a support post, the wind turbine comprising:
   a first support element positioned around a central axis and configured to be connectable to the support post, the first support element having a first track which encircles the central axis;
   a fan assembly engaged with the first support element and rotatable relative to the first support element, the fan assembly comprising:
      a plurality of first trolleys each being coupled to the first support element and spaced relative to each other, the plurality of first trolleys being traversable along the first track to cause rotation of the fan assembly relative to the first support element; and
      a plurality of fan blades coupled to respective ones of the plurality of first trolleys;
   at least one off-axis electrical generator engaged with the fan assembly and having at least one rotating gear driven by the fan assembly when the fan assembly rotates relative to the first support element;
   a solar panel in operative communication with the fan assembly, said solar panel being configured to convert solar energy into electrical energy usable for rotating the fan assembly;
   a rechargeable battery in electrical communication with the solar panel to receive and store electrical energy generated by the solar panel;
   a motor in electrical communication with the rechargeable battery and in operative communication with the fan assembly, the motor receiving electrical energy from the rechargeable battery, the motor being configured to rotate the fan blade housing; and
   a controller operatively coupled to the motor, the controller being configured to selectively transition the motor between ON and OFF configurations, the controller transitioning the motor to the ON configuration when the ambient wind speed is less than 5 miles per hour, the controller transitioning the motor to the OFF configuration when the ambient wind speed is greater than 5 miles per hour.

2. The wind turbine recited in claim 1, further comprising:
   a second support element coupled to the fan assembly, the second support element positioned around the central axis and having a second track which encircles the central axis.

3. The wind turbine recited in claim 2, further comprising:
   a plurality of second trolleys each being coupled to the second support element and spaced relative to each other, the plurality of second trolleys being traversable along the second track;
   each fan blade being coupled to respective ones of the plurality of second trolleys.

4. The wind turbine recited in claim 1, wherein the first support element includes a primary wall and an end wall extending from the primary wall.

5. The wind turbine recited in claim 4, wherein each first trolley includes a pair of wheels disposed on opposed sides of the end wall.

6. The wind turbine recited in claim 1, wherein the first support element includes a rounded tube.

7. The wind turbine recited in claim 6, wherein each first trolley includes at least one wheel engaged with the first support element in spaced relation to each other.

8. The wind turbine recited in claim 1, further comprising a support frame coupled to the first support element and configured to be circumferentially engageable with the support post.

9. The wind turbine recited in claim 8, wherein the support frame includes a generally quadrangular center opening adaptable to receive the support post.

10. The wind turbine recited in claim 8, wherein the support frame includes a generally circular center opening adaptable to receive the support post.

11. The wind turbine recited in claim 1, wherein the fan assembly includes a mounting element coupled to the plurality of trolleys and engaged with the electrical generator.

12. The wind turbine recited in claim 11, wherein the electrical generator includes a generator wheel engaged with the mounting element, wherein rotation of the mounting element about the central axis causes rotation of the generator wheel.

13. The wind turbine recited in claim 12, wherein the generator wheel includes a circumferential groove and the mounting element includes a rib engageable with the circumferential groove.

14. The wind turbine of claim 1, wherein the first support element is disposed completely around the central axis.

15. The wind turbine of claim 1, wherein the first support track completely encircles the central axis.

16. A wind turbine configured to be mountable to a support post, the wind turbine comprising:
   a support frame configured to be circumferentially engageable with the support post;

a first support element positioned around a central axis and coupled to the support frame, the first support element having a first track which encircles the central axis;

a second support element positioned around the central axis and coupled to the support frame, the second support element having a second track which encircles the central axis a fan assembly moveably engaged with the first support element and second support element, the fan assembly comprising:
   a plurality of first trolleys each being coupled to the first support element and spaced relative to each other, the plurality of first trolleys being traversable along the first track to cause rotation of the fan assembly relative to the first support element;
   a plurality of second trolleys each being coupled to the second support element and spaced relative to each other, the plurality of second trolleys being traversable along the second track to cause rotation of the fan assembly relative to the second support element; and
   a plurality of fan blades, each fan blade being coupled to a respective one of the plurality of first trolleys and a respective one of the plurality of second trolleys; and at least one off-axis electrical generator engaged with the fan assembly and having at least one rotating gear driven by the fan assembly when the fan assembly rotates relative to the first support element and the second support element;

a solar panel in operative communication with the fan assembly, said solar panel being configured to convert solar energy into electrical energy usable for rotating the fan assembly;

a rechargeable battery in electrical communication with the solar panel to receive and store electrical energy generated by the solar panel;

a motor in electrical communication with the rechargeable battery and in operative communication with the fan assembly, the motor receiving electrical energy from the rechargeable battery, the motor being configured to rotate the fan blade housing; and a controller operatively coupled to the motor, the controller being configured to selectively transition the motor between ON and OFF configurations, the controller transitioning the motor to the ON configuration when the ambient wind speed is less than 5 miles per hour, the controller transitioning the motor to the OFF configuration when the ambient wind speed is greater than 5 miles per hour.

\* \* \* \* \*